United States Patent [19]
Obayashi et al.

[11] Patent Number: 5,869,419
[45] Date of Patent: Feb. 9, 1999

[54] NITROGEN OXIDE REMOVAL CATALYST

[75] Inventors: Yoshiaki Obayashi; Kozo Iida; Shigeru Nojima, all of Hiroshima-ken; Atsushi Morii; Osamu Naito, both of Nagasaki-ken, all of Japan

[73] Assignee: Mitsubishi Heavy Industries, Ltd., Tokyo, Japan

[21] Appl. No.: 871,520

[22] Filed: Jun. 9, 1997

[30] Foreign Application Priority Data

Jun. 25, 1996 [JP] Japan .................................. 8-164043

[51] Int. Cl.⁶ .............................. B01J 23/00; B01J 23/16; B01J 8/00
[52] U.S. Cl. ...................... 502/305; 502/309; 502/312; 502/350; 502/353; 502/527.15; 423/239.1
[58] Field of Search .................... 502/305, 309, 502/312, 350, 353, 527.15, 527; 428/403, 404, 701, 702; 423/239.1

[56] References Cited

U.S. PATENT DOCUMENTS

| | | |
|---|---|---|
| 4,048,112 | 9/1977 | Matsushita et al. .................. 502/350 |
| 4,466,947 | 8/1984 | Imanari et al. ....................... 502/309 |
| 4,518,710 | 5/1985 | Brennan ................................ 502/309 |
| 4,849,392 | 7/1989 | Hums et al. .......................... 502/309 |
| 4,851,381 | 7/1989 | Hums .................................... 502/309 |
| 4,916,107 | 4/1990 | Brand et al. .......................... 502/309 |
| 4,952,548 | 8/1990 | Kato et al. ............................ 502/309 |
| 5,138,982 | 8/1992 | Ayala et al. .......................... 502/309 |
| 5,409,681 | 4/1995 | Kato et al. ............................ 423/239.1 |

FOREIGN PATENT DOCUMENTS

| | | | |
|---|---|---|---|
| 0161206 | 11/1985 | European Pat. Off. ......... | B01J 23/92 |
| 4006918 | 3/1990 | Germany ........................ | B01J 23/92 |
| 57-078949 | 5/1982 | Japan ............................. | B01D 53/36 |
| 57-180433 A | 11/1982 | Japan ............................. | B01J 23/92 |
| 61-153139 A | 7/1986 | Japan ............................. | B01J 21/06 |
| 04-110038 A | 4/1992 | Japan ............................. | B01J 27/053 |

OTHER PUBLICATIONS

European Search Report related to EP 97 10 9393, completed Oct. 31, 1997 by F. Devisme, The Hague.

*Primary Examiner*—Mark L. Bell
*Assistant Examiner*—Patricia L. Hailey
*Attorney, Agent, or Firm*—Bell Seltzer Intellectual Property Law Group of Alston & Bird LLP

[57] ABSTRACT

This invention effectively utilizes a solid type honeycomb-shaped $NO_x$ removal catalyst which has been used in a catalytic ammonia reduction process and hence reduced in $NO_x$ removal power, and thereby provides an inexpensive catalyst having $NO_x$ removal power equal to that of a fresh catalyst. The nitrogen oxide removal catalyst of this invention, which is useful in a process wherein ammonia is added to exhaust gas and nitrogen oxides present in the exhaust gas are catalytically reduced, has a two-layer structure composed of a lower layer comprising a spent solid type nitrogen oxide removal catalyst and an upper layer comprising a fresh $TiO_2$-$WO_3$-$V_2O_5$ ternary or $TiO_2$-$WO_3$ binary catalyst powder which has been applied to the lower layer so as to give a coating thickness of 100 to 250 $\mu$m. Moreover, the catalyst power constituting the upper layer is a catalyst powder obtained by pulverizing a spent solid type nitrogen oxide removal catalyst.

4 Claims, 1 Drawing Sheet

NITROGEN OXIDE REMOVAL CATALYST

BACKGROUND OF THE INVENTION

1. Field of the Invention

This invention relates to a nitrogen oxide removal catalyst which is useful for the removal of nitrogen oxides present in combustion exhaust gases such as exhaust gas from boilers.

2. Description of the Related Art

Conventionally, in order to remove nitrogen oxides (hereinafter referred to as $NO_x$) produced in boilers and various combustion furnaces for the purpose of preventing air pollution, a catalytic ammonia reduction process wherein ammonia is used as a reducing agent and nitrogen oxides are catalytically decomposed to nitrogen and water with the aid of a catalyst is being widely employed. Most of the $NO_x$ removal catalysts currently used for practical purposes are honeycomb-shaped catalysts which have through-holes of square cross section in order to prevent clogging with dust present in exhaust gas and increase the gas contact area. With respect to catalyst components, titanium oxide is highly suitable for use as a principal component, and vanadium, tungsten and the like are used as additional active components. Thus, $TiO_2$-$WO_3$ binary catalysts and $TiO_2$-$V_2O_5$-$WO_3$ ternary catalysts are popularly used.

However, when a $NO_x$ removal catalyst is used for the treatment of combustion exhaust gas, its $NO_x$ removal power tends to be gradually reduced. Of various $NO_x$ removal catalysts, those used for the treatment of exhaust gas from oil-fired boilers pose no problem because their reduction in $NO_x$ removal power is insignificant. In contrast, $NO_x$ removal catalysts used for the treatment of exhaust gas from coal-fired boilers show a considerable reduction in $NO_x$ removal power with the lapse of time, and hence require some counter-measure. In order to maintain the required $NO_x$ removal power, it is necessary to replace the spent catalyst with a fresh one. However, this is disadvantageous from an economic point of view because a fresh catalyst is expensive and the spent catalyst requires a cost of disposal.

Accordingly, an object of the present invention is to effectively utilize a spent solid type (i.e., the type in which the catalysts themselves form a shaped body) honeycomb-shaped $NO_x$ removal catalyst for use in a catalytic ammonia reduction process (in particular, a spent $NO_x$ removal catalyst which has been used for the removal of $NO_x$ from the exhaust gas of a coal-fired boiler) and thereby provide an inexpensive catalyst having $NO_x$ removal power equal to that of a fresh catalyst.

SUMMARY OF THE INVENTION

In reusing solid type honeycomb-shaped $NO_x$ removal catalysts which had been practically used for the removal of $NO_x$ from the exhaust gas of coal-fired boiler plants for about 500,000 hours, the present inventors investigated the strength and $NO_x$ removal power of the honeycomb-shaped catalysts. As a result, it was confirmed that their strength remained unchanged as compared with fresh catalysts, but their $NO_x$ removal power was reduced to less than ½ of that of fresh catalysts.

As a result of further investigation on the cause for the reduction in the $NO_x$ removal power of these catalysts, it was found that, among various fly ash components attached to the catalyst surface, principally calcium oxide (CaO) was gradually converted into gypsum ($CaSO_4$) which covered the catalyst surface and thereby prevented the reaction gases (i.e., $NO_x$ and $NH_3$) from diffusing into the catalyst. It was also confirmed that this $CaSO_4$ layer lay on the catalyst surface to a depth of several micrometers to several tens of micrometers and the catalyst remained fresh at greater depths and that the $NO_x$ removal action of the solid type honeycomb-shaped $NO_x$ removal catalysts was effectively used only in a surface layer having a thickness of the order of 100 μm. Then, the present inventors hit on the idea that a solid type honeycomb-shaped $NO_x$ removal catalyst having sufficiently high denitration power might be obtained by coating the surface of a solid type honeycomb-shaped $NO_x$ removal catalyst having reduced $NO_x$ removal power with a catalytic component having $NO_x$ removal power. On the basis of this conception, the present inventors have made an intensive investigation and have now completed the present invention.

Thus, the present invention provides (1) a nitrogen oxide removal catalyst for use in a process wherein ammonia is added to exhaust gas and nitrogen oxides present in the exhaust gas are catalytically reduced, said catalyst having a two-layer structure composed of a lower layer comprising a spent solid type nitrogen oxide removal catalyst and an upper layer comprising a fresh $TiO_2$-$WO_3$-$V_2O_5$ ternary or $TiO_2$-$WO_3$ binary catalyst power which has been applied to the lower layer so as to give a coating thickness of 100 to 250 μm; (2) a nitrogen oxide removal catalyst as described above in (1) wherein the fresh catalyst power consists essentially of 0 to 10% by weight of $V_2O_5$, 5 to 20% by weight of $WO_3$ and the balance being $TiO_2$; and (3) a nitrogen oxide removal catalyst as described above in (1) wherein the catalyst power constituting the upper layer is a catalyst powder obtained by pulverizing a spent solid type nitrogen oxide removal catalyst.

The present invention relates to a $NO_x$ removal catalyst which is useful in a process wherein ammonia is added to exhaust gas and $NO_x$ present in the exhaust gas are removed by catalytic reduction. This $NO_x$ removal catalyst has a two-layer structure composed of a lower layer comprising a spent solid type $NO_x$ removal catalyst and an upper layer comprising a catalyst powder applied to the lower layer. In the lower layer, a spent solid type honeycomb-shaped catalyst which has been used for the removal of $NO_x$ from combustion exhaust gas, and has become useless because of a reduction in $NO_x$ removal power is used directly in the form of a shaped product. The catalyst powder constituting the upper layer may be a fresh titania-based (e.g., $TiO_2$-$V_2O_5$-$WO_3$) catalyst powder or a catalyst powder obtained by pulverizing a spent solid type honeycomb-shaped catalyst which has been used for the removal of $NO_x$, for example, from the exhaust gas of a coal-fired boiler and has become useless.

Although the composition of the catalyst used in the upper layer may vary according to the exhaust gas conditions (i.e., the type of fuel used, the temperature of the exhaust gas, and the like) under which the catalyst of the present invention is used, it is selected from $TiO_2$-$V_2O_5$-$WO_3$ ternary and $TiO_2$-$WO_3$ binary $NO_x$ removal catalysts which are currently used for practical purposes. Typically, this catalyst consists essentially of 0 to 10% by weight of $V_2O_5$, 5 to 20% by weight of $WO_3$ and the balance being $TiO_2$. The thickness of the upper catalyst layer is preferably in the range of 100 to 250 μm. If the thickness thereof is less than 100 μm, the resulting catalyst will have low $NO_x$ removal power, and if it is greater than 250 μm, the upper catalyst layer will have poor adhesion to the lower catalyst layer and may be separated therefrom.

As described previously, the reduced $NO_x$ removal power of a spent solid type honeycomb-shaped $NO_x$ removal catalyst is attributable to a gypsum layer covering the catalyst surface to a depth ranging from several micrometers to several tens of micrometers. At greater depths, the catalyst is scarcely reduced in $NO_x$ removal power. Consequently, if a solid type honeycomb-shaped $NO_x$ removal catalyst having reduced $NO_x$ removal power (i.e., a spent catalyst) is pulverized, the gypsum concentration is decreased to substantially the same level as in a fresh binary or ternary $NO_x$ removal catalyst. As a result, there is obtained a $NO_x$ removal catalyst powder having $NO_x$ removal equal to that of a fresh catalyst. In the present invention, therefore, a catalyst powder obtained by pulverizing a spent solid type honeycomb-shaped $NO_x$ removal catalyst may be used as a fresh binary or ternary $NO_x$ removal catalyst. This makes it possible to produce a $NO_x$ removal catalyst having the same degree of strength and $NO_x$ removal powder as a fresh solid type honeycomb-shaped $NO_x$ removal catalyst.

DETAILED DESCRIPTION OF PREFERRED EMBODIMENTS

Figure 1:
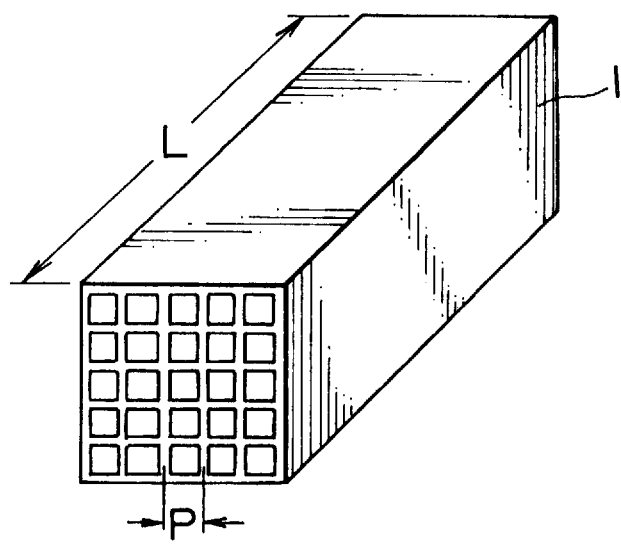
FIG. 1 is a perspective view of a solid type honeycomb-shaped $NO_x$ removal catalyst in accordance with the present invention.
Figure 2:
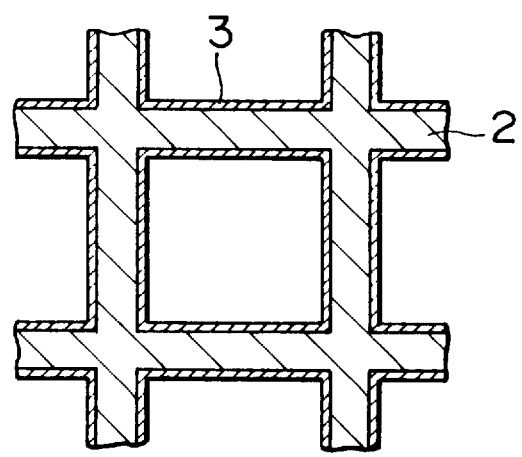
FIG. 2 is an enlarged cross-sectional view illustrating the honeycomb configuration of the solid type honeycomb-shaped $NO_x$ removal catalyst in accordance with the present invention.

The structure of a $NO_x$ removal catalyst in accordance with the present invention is explained with reference with FIGS. 1 and 2. FIG. 1 is a perspective view thereof and FIG. 2 is an enlarged cross-sectional view illustrating its honeycomb configuration. In FIG. 1, numeral 1 designates a solid type honeycomb-shaped $NO_x$ removal catalyst in accordance with the present invention, and P and L stand for the pitch (i.e., the center distance between adjacent walls) and length of the honeycomb, respectively. In FIG. 2, numeral 2 designates a lower catalyst layer (comprising a spent solid type $NO_x$ removal catalyst) and numeral 3 designates an upper catalyst layer (comprising a powder of a fresh $NO_x$ removal catalyst or a spent solid type $NO_x$ removal catalyst).

In order to demonstrate the effects of nitrogen oxide removal catalysts in accordance with the present invention, the following examples are given.

EXAMPLE 1

A solid type honeycomb-shaped catalyst which had been used in exhaust gas from coal-fired boiler plant A for about 45,000 hours and had become useless because of a reduction in $NO_x$ removal power was provided. This catalyst had a honeycomb configuration as shown in FIG. 1 and its pitch (P) was 7.4 mm. This catalyst was composed of 90.9% by weight of $TiO_2$, 8.5% by weight of $WO_3$ and 0.6% by weight of $V_2O_5$.

On the other hand, powdered titania (MC-50; manufactured by Ishihara Sangyo Kaisha, Ltd., Japan) as a raw material for $TiO_2$ was impregnated with a methylamine solution of ammonium metavanadate as a raw material for $V_2O_5$ and a methylamine solution of ammonium paratungstate as a raw material for $WO_3$, followed by drying and firing. Thus, there was obtained a powder composed of 90.9% by weight of $TiO_2$, 8.5% by weight of $WO_3$ and 0.6% by weight of $V_2O_5$. This powder had a particle diameter range of 0.2 to 23 μm and a median diameter of 1.1 μm.

Then, a slurry was prepared by adding water, a silica sol and an alumina sol to the above powder, and applied to the above honeycomb-shaped catalyst so as to give a coating thickness of 100 μm. The catalyst thus obtained was called Catalyst 1.

EXAMPLE 2

A solid type honeycomb-shaped catalyst (with a pitch of 7.4 mm) which had been used in exhaust gas from coal-fired boiler plant A for about 45,000 hours and had become useless because of a reduction in $NO_x$ removal power was provided. This catalyst had the same composition as that used in Example 1. On the other hand, a similar catalyst (composed of 90.9% by weight of $TiO_2$, 0.6% by weight of $V_2O_5$ and 8.5% by weight of $WO_3$) having reduced $NO_x$ removal power was pulverized to obtain a catalyst powder (having a particle diameter range of 0.1 to 20 μm and a median diameter of 2.3 μm). Then, a slurry was prepared by adding water, a silica sol and an alumina sol to this catalyst powder, and applied to the above honeycomb-shaped catalyst so as to give a coating thickness of about 100 μm. The catalyst thus obtained was called Catalyst 2.

EXAMPLE 3

A solid type honeycomb-shaped catalyst (with a pitch of 7.4 mm) which had been used in exhaust gas from coal-fired boiler plant A for about 45,000 hours and had become useless because of a reduction in $NO_x$ removal power was provided for use as the underlying catalyst. This catalyst had the same composition as that used in Example 1. On the other hand, a catalyst similar to the underlying catalyst was pulverized to obtain a catalyst powder having a particle diameter range of 0.1 to 20 μm and a median diameter of 2.3 μm. This catalyst powder was impregnated with a methylamine solution of ammonium metavanadate as a raw material for $V_2O_5$, and a methylamine solution of ammonium paratungstate as a raw material for $WO_3$ so as to increase its $V_2O_5$ content by 2.35% by weight, followed by drying and firing. Thus, a powder composed of 88.5% by weight of $TiO_2$, 8.5% by weight of $WO_3$ and 3.0% by weight of $V_2O_5$ was obtained for use as the upper catalyst layer. A slurry was prepared by adding water, a silica sol and an alumina sol to this powder, and applied to the surface of the above honeycomb-shaped catalyst so as to give a coating thickness of about 100 μm. The catalyst thus obtained was called Catalyst 3.

EXAMPLE 4

A solid type honeycomb-shaped catalyst (with a pitch of 7.4 mm) which had been used in exhaust gas from coal-fired boiler plant B for about 60,000 hours and had become useless because of a reduction in $NO_x$ removal power was provided for use as the underlying catalyst. This catalyst had the same composition as that used in Example 1. On the other hand, a catalyst similar to the underlying catalyst was pulverized to obtain a catalyst powder having a particle diameter range of 0.1 to 26 μm and a median diameter of 2.5 μm. Then, a slurry was prepared by adding water, a silica sol and an alumina sol to this catalyst powder, and applied to surface of the above honeycomb-shaped catalyst so as to give a coating thickness of about 100 μm. The catalyst thus obtained was called Catalyst 4.

EXPERIMENTS

In these experiments, fresh catalysts for use in coal-fired boiler plants A and B, and the spent catalysts used in the examples were used as control catalysts. By comparison with these control catalyst, Catalyst 1–4 obtained in the foregoing examples were tested for $NO_x$ removal power under the conditions shown in Table 1. And the test results were shown in Table 2.

TABLE 1

| Testing conditions | |
| --- | --- |
| Shape of catalyst | 6 holes × 7 holes × 500 mm long |
| Flow rate of gas | 20.1 $Nm^3/m^2 \cdot hr$ |
| SV value | 16,600 $hr^{-1}$ |
| $NH_3/NO_x$ ratio | 1.0 |
| Temperature of gas | 380° C. |
| Composition of gas | $NO_x$ = 150 ppm |
| | $NH_3$ = 150 ppm |
| | $SO_x$ = 800 ppm |
| | $O_2$ = 4% |
| | $CO_2$ = 11% |
| | $H_2O$ = 11% |
| | $N_2$ = Balance |

TABLE 2

| | Test results | |
| --- | --- | --- |
| | Catalyst | Degree of $NO_x$ removal (%) |
| Example | 1 | 67.0 |
| | 2 | 65.4 |
| | 3 | 75.6 |
| | 4 | 64.2 |
| Comparative Example | Spent catalyst used in plant A | 49.8 |
| | Spent catalyst used in plant B | 26.2 |
| | Fresh catalyst for use in plant A | 65.3 |
| | Fresh catalyst for use in plant B | 64.5 |

Degree of $NO_x$ removal (%) = {[(Inlet $NO_x$ content) − (Outlet $NO_x$ content)]/(Inlet $NO_x$ content)} × 100

These results reveal that, when catalysts which had been used in coal-fired boiler plants A and B and hence had reduced $NO_x$ removal power were reconstructed according to the present invention, there were obtained catalysts having $NO_x$ removal power equal to that of fresh catalysts. Moreover, they also reveal that the $NO_x$ removal power of fresh catalysts was surpassed by supporting an active component (such as $V_2O_5$) on a spent catalyst.

Thus, the present invention makes it possible to effectively utilize spent solid type honeycomb-shaped $NO_x$ removal catalysts (especially for use with coal-fired boilers) which have conventionally been useless and disposed of, and thereby provide inexpensive NO, removal catalysts while reducing the amount of industrial waste. Consequently, the present invention can produce marked industrial effects.

We claim:

1. A nitrogen oxide removal catalyst for use in a process wherein ammonia is added No exhaust gas and nitrogen oxides present in the exhaust gas are catalytically reduced, said catalyst having a two-layer structure composed of a lower layer comprising a spent solid type nitrogen oxide removal catalyst and an upper layer comprising a fresh $TiO_2$-$WO_3$-$V_2O_5$ ternary or $TiO_2$-$WO_3$ binary catalyst powder which has been applied to the lower layer so as to give a coating thickness of 100 to 250 μm.

2. A nitrogen oxide removal catalyst as claimed in claim 1 wherein the fresh catalyst powder consists essentially of 0 to 10% by weight of $V_2O_5$, 5 to 20% by weight of $WO_3$ and the balance being $TiO_2$.

3. A nitrogen oxide removal catalyst as claimed in claim 1 wherein the spent solid type nitrogen oxide removal catalyst is a honeycomb-shaped catalyst.

4. A nitrogen oxide removal catalyst for use in a process wherein ammonia is added to exhaust gas and nitrogen oxides present in the exhaust gas are catalytically reduced, said catalyst having a two-layer structure composed of a lower layer comprising a spent solid type nitrogen oxide removal catalyst and an upper layer comprising a catalyst powder which has been applied to the lower layer so as to give a coating thickness of 100 to 250 μm wherein the catalyst powder constituting the upper layer is a catalyst powder obtained by pulverizing a spent solid type nitrogen oxide removal catalyst.

\* \* \* \* \*

UNITED STATES PATENT AND TRADEMARK OFFICE
CERTIFICATE OF CORRECTION

PATENT NO. : 5,869,419
DATED : February 9, 1999
INVENTOR(S) : Obayashi et al.

It is certified that error appears in the above-identified patent and that said Letters Patent is hereby corrected as shown below:

On the title page, item [56] should read:

In the References Cited, U.S. PATENT DOCUMENTS, line 8, "5,138,982" should read --5,139,982--.

Column 6, line 16, "No" should read --to--.

Signed and Sealed this

Third Day of August, 1999

Q. TODD DICKINSON

*Attest:*

*Attesting Officer*  *Acting Commissioner of Patents and Trademarks*